United States Patent
Mitra et al.

(10) Patent No.: US 10,922,826 B1
(45) Date of Patent: Feb. 16, 2021

(54) DIGITAL TWIN MONITORING SYSTEMS AND METHODS

(71) Applicant: Ford Global Technologies, LLC, Dearborn, MI (US)

(72) Inventors: Pramita Mitra, West Bloomfield, MI (US); Prashant Rao, Ypsilanti, MI (US); Eric H. Wingfield, Ann Arbor, MI (US); Jash Patel, Dearborn, MI (US); Abhishek Sharma, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/534,938

(22) Filed: Aug. 7, 2019

(51) Int. Cl.
*G06T 7/292* (2017.01)
*H04N 5/247* (2006.01)

(52) U.S. Cl.
CPC .... *G06T 7/292* (2017.01); *G06T 2207/30196* (2013.01); *G06T 2207/30232* (2013.01); *G06T 2207/30236* (2013.01); *G06T 2207/30252* (2013.01); *H04N 5/247* (2013.01)

(58) Field of Classification Search
CPC .......... B61L 25/02; B61L 27/00; B61L 15/00
USPC ................... 348/112–119, 142–160
See application file for complete search history.

(56) References Cited

U.S. PATENT DOCUMENTS

2016/0180669 A1* 6/2016 Bradshaw .......... G08B 13/2402
340/572.1
2017/0287335 A1 10/2017 Ansari
2017/0313332 A1* 11/2017 Paget ................. H04N 5/23203
2017/0371345 A1 12/2017 Cohen et al.
2019/0025853 A1 1/2019 Julian et al.
2019/0050732 A1 2/2019 Anderson
2019/0057647 A1* 2/2019 Hack ................... H01L 27/3213

OTHER PUBLICATIONS

Karaki, et al., "An interactive review of object motion detection, classification and tracking algorithms related to video analysis in computer vision. International Journal of Engineering," 2018, vol. 11, No. 5, pp. 771-789.
Di'Palo, N. (Jun. 21, 2018). How to add Person Tracking to a Drone using Deep Learning and NanoNets (12 pages). Retrieved from https://medium.com/nanonets/how-i-built-a-self-flying-drone-to-track-people-in-under-50-lines-of-code-7485de7f828e.

* cited by examiner

*Primary Examiner* — Talha M Nawaz
(74) *Attorney, Agent, or Firm* — Brandon Hicks; Eversheds Sutherland (US) LLP

(57) ABSTRACT

This disclosure is generally directed to systems and methods for operating a monitoring system incorporating a digital twin. In one exemplary method of operating the digital twin, one or more images captured by an imaging apparatus may be used to define a first portion of a surveilled area as a zone of primary interest and a second portion of the surveilled area as a zone of secondary interest. The digital twin may be utilized to primarily focus on the zone of primary interest such as for determining a pattern of movement of one or more objects in the zone of primary interest. One or both of the zone of primary interest and the zone of secondary interest may be dynamically redefined upon receiving additional images that indicate a modification in the pattern of movement of one or more objects in the surveilled area.

20 Claims, 8 Drawing Sheets

DIGITAL TWIN MONITORING SYSTEMS AND METHODS

FIELD OF THE DISCLOSURE

This disclosure generally relates to monitoring systems, and more particularly relates to monitoring systems employing a digital twin.

BACKGROUND

Monitoring systems may be implemented by using various kinds of devices, systems, and procedures. Some monitoring systems include imaging devices such as video cameras and infrared cameras for various purposes such as for securing a property, for detecting suspicious activity, or for monitoring traffic. Processing circuitry used for processing images captured by an imaging device may vary from one monitoring system to another depending on the nature and purpose of the monitoring. For example, a sophisticated image processing system may be used for processing images in a monitoring system that employs a high-speed imaging camera, whereas a relatively less sophisticated image processing system may be employed to process images in a monitoring system that employs a less-expensive camera for capturing images containing objects that remain stationary for extended periods of time.

In at least some applications, the sophisticated image processing system may be found suitable for use at a first location where a monitored area contains a few fast moving objects but may be unsuitable for use at a second location where the monitoring area may be too large for detecting fast moving objects and/or may include too many fast moving objects that cannot be monitored effectively.

It is therefore desirable to provide monitoring systems and methods that offer desirable attributes such as scalability, transportability, and cost-effectiveness for use in various applications at various locations.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
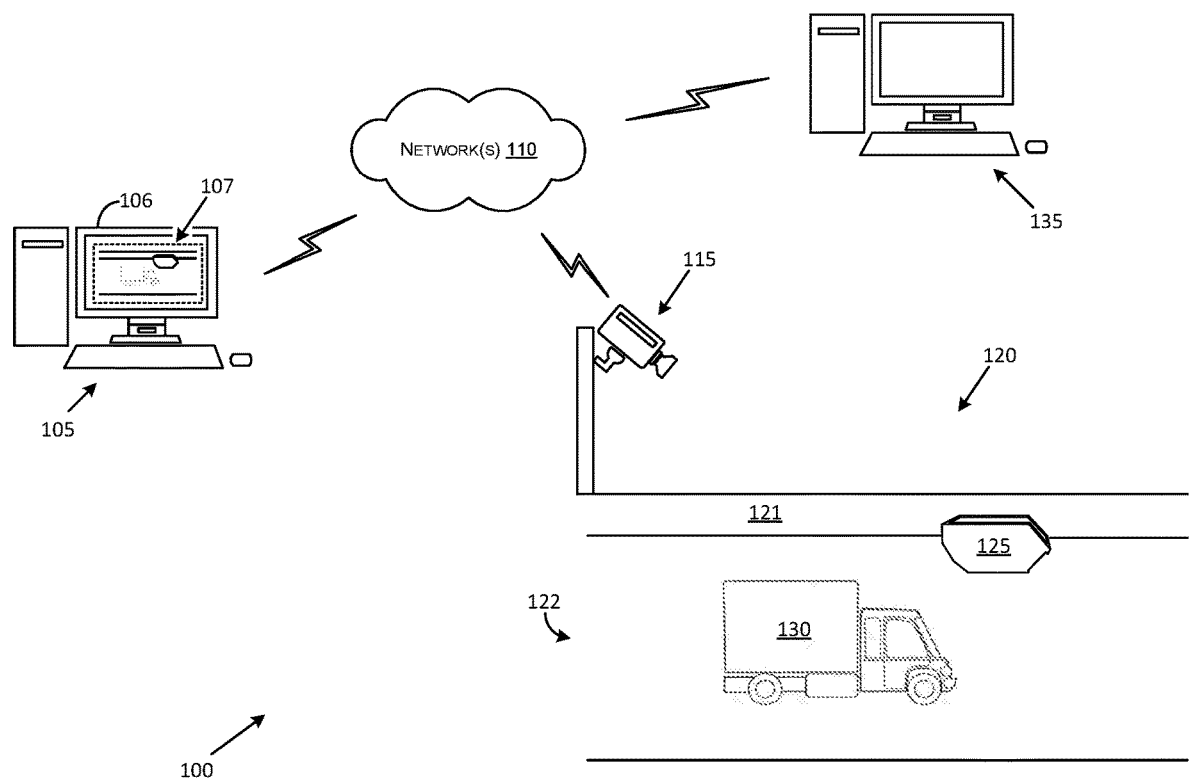
FIG. 1 illustrates a first exemplary monitoring system that includes a digital twin displayed on a computer in accordance with an embodiment the disclosure.

In terms of a general overview, various exemplary embodiments described in this disclosure are directed to systems and methods for operating a monitoring system incorporating a digital twin. In some instances, digital twin refers to a digital replica of a physical asset, process, people, place, system, and/or device. In one exemplary method of operating the digital twin, one or more images captured by an imaging apparatus may be used to define a first portion of a surveilled area as a zone of primary interest and a second portion of the surveilled area as a zone of secondary interest. The digital twin may be utilized to primarily focus on the zone of primary interest such as for determining a pattern of movement of one or more objects in the zone of primary interest. One or both of the zone of primary interest and the zone of secondary interest may be dynamically redefined upon receiving additional images that indicate a modification in the pattern of movement of one or more objects in the surveilled area.

Illustrative Embodiments

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular component such as a first processor in a first computer may be performed by another component such as a second processor in another computer. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and terms are used herein solely for convenience and such words and terms should be interpreted as referring to various objects and actions that are generally understood in various forms and equivalencies by persons of ordinary skill in the art. For example, words such as "object" and "vehicle" may be used interchangeably and should be understood in the context of the disclosure. Words such as "data" "signals," "indication," and "information" may be used interchangeably and should be understood in the context of the disclosure. Words such as "display," "images," "imagery," "snapshots," "video," and "video frames," may be used herein in an interchangeable manner and should be understood to refer to sources of information for monitoring purposes. Furthermore, the word "information" as used herein may refer to various items such as digital data, analog data, audio content, video content, and/or messages. These items may be operated upon by a computer containing a processor. Words such as "monitoring" and "surveillance" may be used interchangeably and should be understood in the context of the disclosure. Phrases such as "an object is displayed" or "based on an (xxx factor)" as used herein should not be construed exclusively in a singular sense. These phrases should be understood to also encompass multiple objects that may be displayed and based on multiple factors. It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

FIG. 1 illustrates an exemplary monitoring system 100 that includes a digital twin 107 displayed on a screen 106 of a computer 105 in accordance with an embodiment the disclosure. The computer 105 may be coupled via a network 110 to an imaging apparatus 115 that is configured to capture one or more images of a surveilled area 120. The network 110 may include any one or a combination of various networks such as a data network, a telephone network, a cellular network, a cable network, a wireless network, a private network, a public network, a local area network (LAN), a wide area network (WAN), and the Internet. In some instances, the network 110 may support communication technologies such as Bluetooth, cellular, near-field communication (NFC), Wi-Fi, and/or Wi-Fi direct. In another exemplary embodiment, the computer 105 may be directly coupled to the imaging apparatus 115 via an electrical cable or a fiber optic cable and communicatively coupled via the network 110 to other components such as a server system 135.

The imaging apparatus 115 can include various types of imaging devices such as, for example, a digital camera configured to take snapshots of the surveilled area 120 (on a cyclic basis, an intermittent basis, or as-needed basis), a video camera configured to generate video files based on video surveillance of the surveilled area 120, or an infrared camera configured to generate infrared imagery (snapshots and/or video) of the surveilled area 120. The imaging apparatus 115 may also include components such as a motion detector or a speed sensor. The motion detector may be used in some applications to trigger image capture (or video capture) in the imaging apparatus 115. The speed detector may be used to obtain motion information associated with one or more moving objects in the surveilled area 120. In an exemplary implementation, the motion information may be a numerical speed value of a moving object in the surveilled area 120 (65 miles per hour, for example). The numerical speed value may be propagated to the computer 105 from the imaging apparatus 115 via the network 110.

The numerical speed value may further include a time-stamp that is indicative of a time at which the speed of the moving object was captured. In another implementation, the computer 105 may determine a speed of an object by processing multiple snapshots or video frames captured by the imaging apparatus 115 and propagated to the computer 105 via the network 110.

In the exemplary embodiment shown in FIG. 1, the surveilled area 120 includes an exemplary road 122, bordered by an exemplary sidewalk 121 on one side. In other embodiments in accordance with the disclosure, any of various other types of areas may be placed under surveillance. A few examples of such areas may include a factory floor, a warehouse, a parking lot, a prison, and a company location. Each of these areas may include a combination of moving objects and stationary objects over one or more periods of time.

In this exemplary embodiment, the surveilled area 120 may include one or more moving objects such as, for example, a vehicle 130 travelling east on the road 122, and one or more stationary objects such as a dumpster 125 that is stationed upon a section of the road 122 adjacent to the sidewalk 121. The surveilled area 120 may further include moving objects such as a bicyclist (not shown) riding a bicycle down the road 122, and/or a pedestrian (not shown) walking on the sidewalk 121. The surveilled area 120 may also include stationary objects such as an unattended vehicle, a wrecked vehicle involved in an accident, a light pole, a traffic light, a construction barrier, trash, and/or debris. When the surveilled area 120 is a factory floor, the moving objects may include workers and/or vehicles and the stationary objects may include machinery, packages, and building structures (pillars, poles, racks, etc.).

The images captured by the imaging apparatus 115 may be received by the computer 105, processed for obtaining information about the surveilled area 120, and used for generating the digital twin 107 that is displayed on the screen 106. In at least some implementations where the imaging apparatus 115 is configured to transmit real-time images of the surveilled area 120, the digital twin 107 may be updated in real-time for rendering a real-time digital replication of the surveilled area 120. When rendered in real-time, any changes in the surveilled area 120, such as for example, the vehicle 130 moving out of the surveilled area 120 or the dumpster 125 being relocated on to the sidewalk 121, can be detected by the computer 105 and used for various purposes.

In one exemplary application, the computer 105 may be configured to detect the relocation of a stationary object such as the dumpster 125 on the sidewalk 121. Upon detecting the relocation, the computer 105 may obtain data from a server system 135 to verify whether such an action is permissible under laws governing the surveilled area 120. In general, the server system 135 can be a cloud-based system that includes one or more computers containing components such as processors and memory devices. In the illustrative example shown in FIG. 1, the server system 135 can include at least one computer having at least a processor and a memory. The memory, which is an example of a non-transitory computer-readable medium, may be used to store various types of information such as laws and rules governing the surveilled area 120, traffic rules, municipality codes, vehicle registration data, and registration information (permits, licenses, etc.). The server system 135 may respond to a request received from a computer such as the computer 105, by transmitting the requested information to the computer via the network 110.

The information received from the server system 135 may be used by the computer 105 to process imagery received from the imaging apparatus 115 and operate the digital twin 107 in accordance with one or more embodiments of the disclosure. The methods for processing imagery and/or operating the digital twin 107 may provide various advantages such as minimizing the amount of time for initializing the monitoring system 100 to operate in various environments and various applications, optimizing information obtained from processing imagery, generating desired information based on high-speed processing of selected portions of a surveilled area, rapidly and dynamically modifying monitored zones inside a surveilled area, and system scalability so as to allow multiple imaging systems to cooperate efficiently for generating desired information about a surveilled area. Some of these aspects are described below in more detail using other figures.

Figure 2:
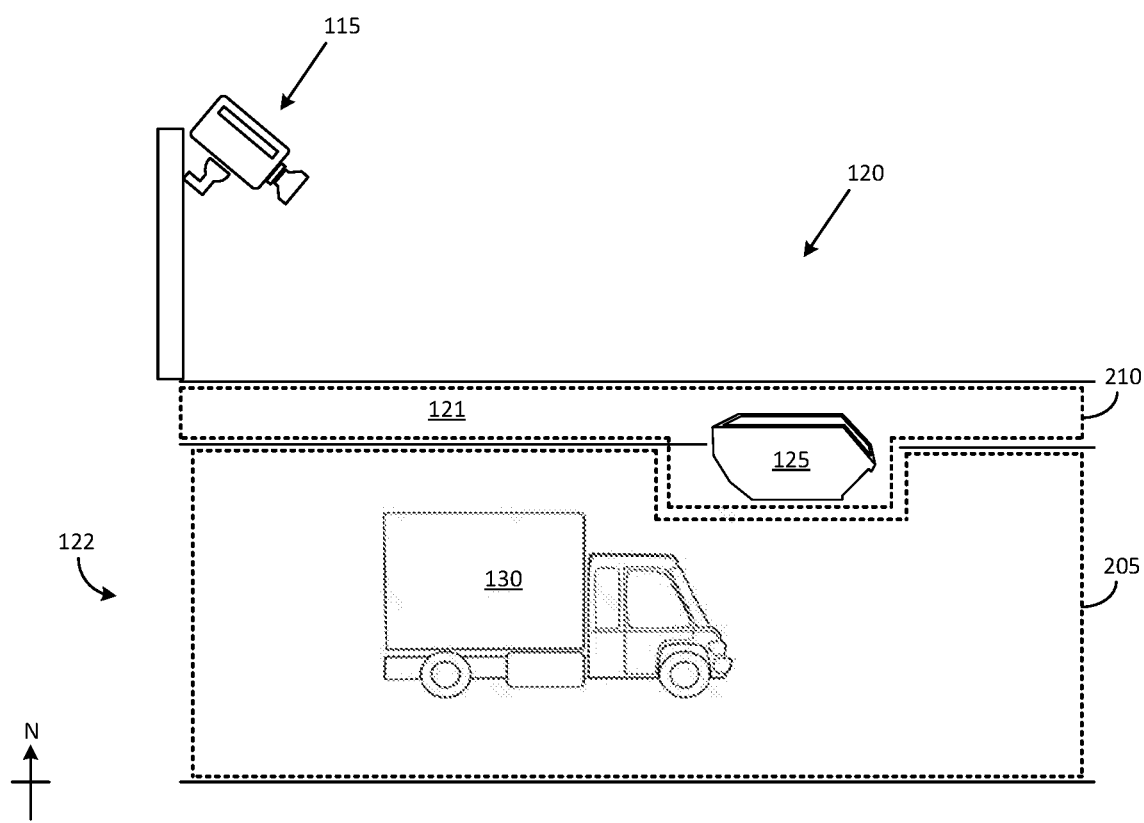
FIG. 2 illustrates a first exemplary operational configuration that may be used in the digital twin shown in FIG. 1.

FIG. 2 illustrates a first exemplary operational configuration that may be used by the computer 105 to process images received from the imaging apparatus 115 and generate the digital twin 107. In this first exemplary operational configuration, the surveilled area 120 may be partitioned into two or more zones of interest based on various criteria. For example, the surveilled area 120 may be partitioned into a zone of primary interest 205 and a zone of secondary interest 210 based on a motivation to monitor moving objects with a higher level of priority than stationary objects that may be monitored with a relatively lower level of priority.

In one exemplary scenario, the surveilled area 120 may be an alleyway and the road 122 may be a one-way street in which vehicles are permitted to only travel eastwards. The monitoring system 100 may be used to capture images of the surveilled area 120 that provide information such as an occurrence of one or more infractions. The sidewalk 121 in this example, may be a narrow sidewalk, and an exemplary infraction may involve parking of the dumpster 125 upon the sidewalk 121 thereby compelling pedestrians walking on the sidewalk 121 to step on the road 122 in order to get around the dumpster 125. As another example of an infraction, local residents and/or business people in the area may have noticed that some vehicles disregard traffic rules several times during a day and drive the wrong way in an opposite direction.

Using the imaging apparatus 115 to capture images of the entire surveilled area 120 at a high capture rate (an image every second, for example) and use the computer 105 to process a large amount of image content generated by such a high capture rate may be sub-optimal in at least some cases such as when the dumpster 125 is moved. Consequently, in accordance with the disclosure, the computer 105 may be configured to operate in a manner that minimizes and/or simplifies image processing operations for generating the digital twin 107.

In the first exemplary operational configuration shown in FIG. 2, the zone of primary interest 205 may be defined on the basis of factors such as a pattern of movement of one or more objects in the surveilled area 120 and the availability of a drivable portion of the road 122. Towards this end, the computer 105 may be configured to process a first image of the surveilled area 120 that shows the dumpster 125 parked on the road 122 and a vehicle 130 moving on the road 122 at the time the image was captured by the imaging apparatus 115, followed by additional images that may be processed by the computer 105 to validate or modify the information derived from the first image.

The information derived from the first image and/or additional images may be used by the computer 105 to define a perimeter of the zone of primary interest 205. The perimeter of the zone of the primary interest 205, which precludes a portion of the road 122 on which the dumpster 125 is located, may be based on one or more factors such as a pattern of movement of the vehicle 130 and/or the dumpster 125. The pattern of movement of the vehicle 130 and the dumpster 125 may be monitored over a first period of time (a day, for example) and used to classify the vehicle 130 as a moving object for purposes of surveillance. The pattern of movement of the dumpster 125 may be monitored over a second period of time (a month, for example) to determine that the dumpster 125 is moved occasionally from the road 122 to the sidewalk 121, or is never moved from the road 122. The relatively slow occurrence of movement, or the lack of movement, of the dumpster 125 may be used by the computer 105 to classify the dumpster as a stationary object for purposes of surveillance. In one exemplary implementation, each of the first period of time and the second period of time may be determined by an operator of the computer 105 after evaluating one or more characteristics of the various objects in the surveilled area 120.

The computer 105 may define a perimeter of the zone of secondary interest 210 based in part on classifying the dumpster 125 as a stationary object. The zone of secondary interest 210 may encompass the sidewalk 121 and a portion of the road 122 on which the dumpster 125 is located.

The computer 105 may process image content in the zone of primary interest 205 with a higher level of priority than that in the zone of secondary interest 210. In one exemplary procedure in accordance with the disclosure, the imaging apparatus 115 is configured to capture images of the zone of primary interest 205 more frequently and/or for a longer period of time than images of the zone of secondary interest 210. For example, a first set of images containing image content exclusively from the zone of primary interest 205 may be captured for a long period of time (an hour, for example) and a second set of images containing image content from the zone of secondary interest 210 may be captured for a shorter period of time (10 minutes, for example). Such a procedure reduces the amount of image data processed by the computer 105 in comparison to an amount of data that would be generated by the imaging apparatus 115 upon scanning both the zone of primary interest 205 and the zone of secondary interest 210 in a concurrent manner all the time.

In another exemplary procedure, the imaging apparatus 115 may be configured to capture a first set of images by scanning the zone of primary interest 205 at a fast scanning rate (20 scans per hour, for example) and to capture a second set of images by scanning the zone of secondary interest 210 at a relatively slower scanning rate (2 scans per hour, for example). This exemplary procedure also reduces the amount of image data processed by the computer 105 in comparison to an amount of data that would be generated by the imaging apparatus 115 upon using the same scanning rate for scanning both the zone of primary interest 205 and the zone of secondary interest 210.

Figure 3:
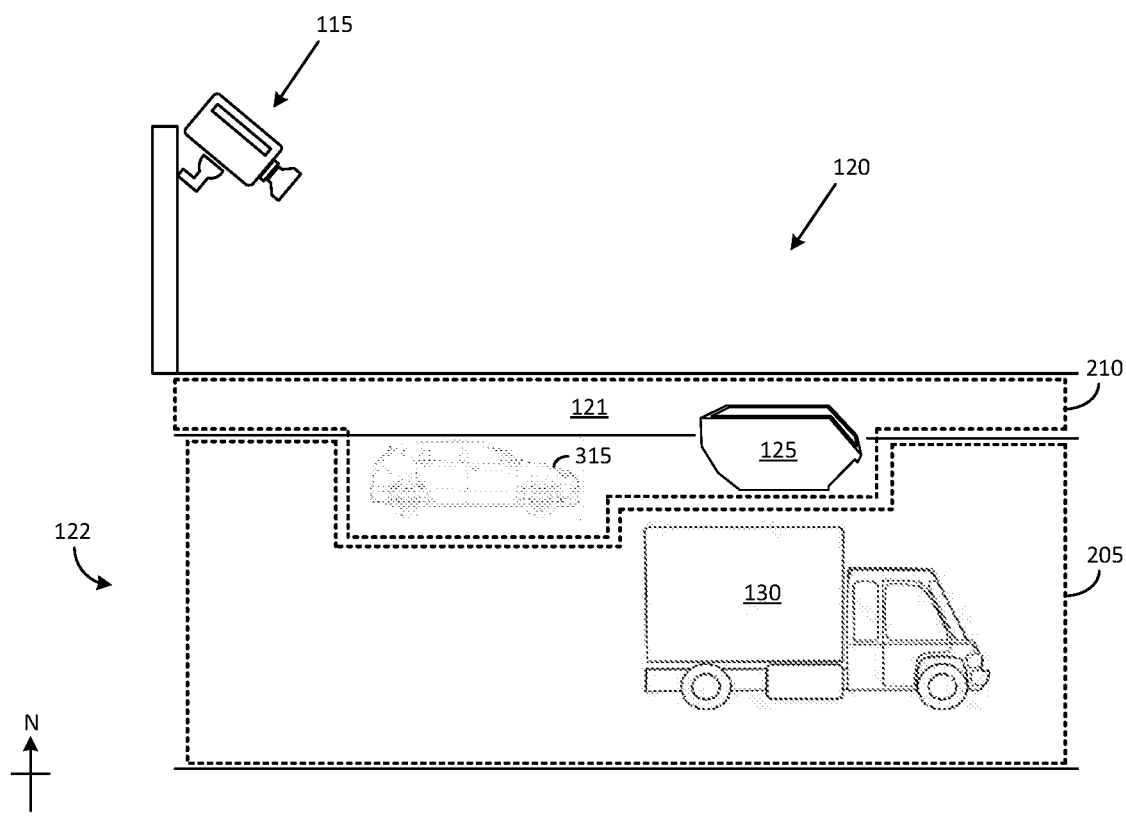
FIG. 3 illustrates a second exemplary operational configuration that may be used in the digital twin shown in FIG. 1.

FIG. 3 illustrates a second exemplary operational configuration that may be used by the computer 105 to process images received from the imaging apparatus 115 and generate the digital twin 107. In this second operational configuration, the computer 105 may process one or more images captured by the imaging apparatus 115 and detect a vehicle 315 that is parked on the road 122 for an extended period of time (several days, for example). The computer 105 may then classify the vehicle 315 as a stationary object that has to be treated as an obstruction by moving objects such as the vehicle 130. In this case, a perimeter of the zone of secondary interest 210 may be redefined by the computer 105 in accordance with the classification of the vehicle 315 as a stationary object so as to encompass a portion of the road 122 on which the vehicle 315 is parked. The perimeter of the zone of primary interest 205 is also redefined in this case so as to preclude the portion of the road 122 on which the vehicle 315 is parked. Redefining one or both of the zone of primary interest 205 and the zone of secondary interest 210 may be carried out dynamically in accordance with the disclosure whenever one or more objects move into the surveilled area 120 or an object that is already present in the surveilled area 120 undergoes a modification in a pattern of movement.

Figure 4:
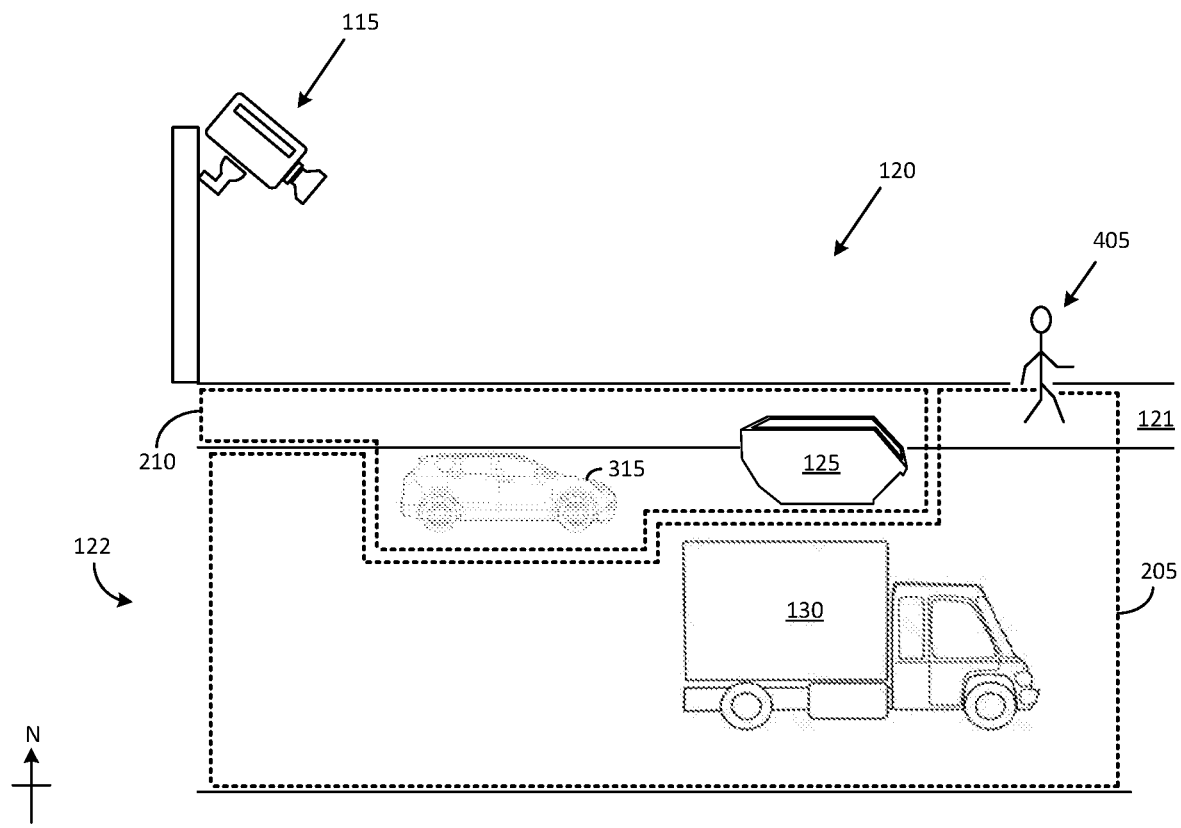
FIG. 4 illustrates a third exemplary operational configuration that may be used in the digital twin shown in FIG. 1.

FIG. 4 illustrates a third exemplary operational configuration that may be used by the computer 105 to process images received from the imaging apparatus 115 and generate the digital twin 107. In this third operational configuration, the computer 105 may process one or more images captured by the imaging apparatus 115 and detect a pedestrian 405 walking on the sidewalk 121. The computer 105 may classify the pedestrian 405 as a moving object and may redefine a perimeter of the zone of primary interest 205 based on this classification. The perimeter of the zone of secondary interest 210 is also redefined to preclude the portion of the sidewalk 121 on which the pedestrian 405 is walking. Redefining one or both of the zone of primary interest 205 and the zone of secondary interest 210 may be carried out dynamically in accordance with the disclosure, whenever one or more objects such as the pedestrian 405 move into the surveilled area 120 or an object that is already present in the surveilled area 120 undergoes a modification in a pattern of movement. The computer 105 may also be configured to process image content from both the zone of primary interest 205 and the zone of secondary interest 210 in conformance with one or more laws that preclude collection of personal information of people (such as the pedestrian 405).

Figure 5:
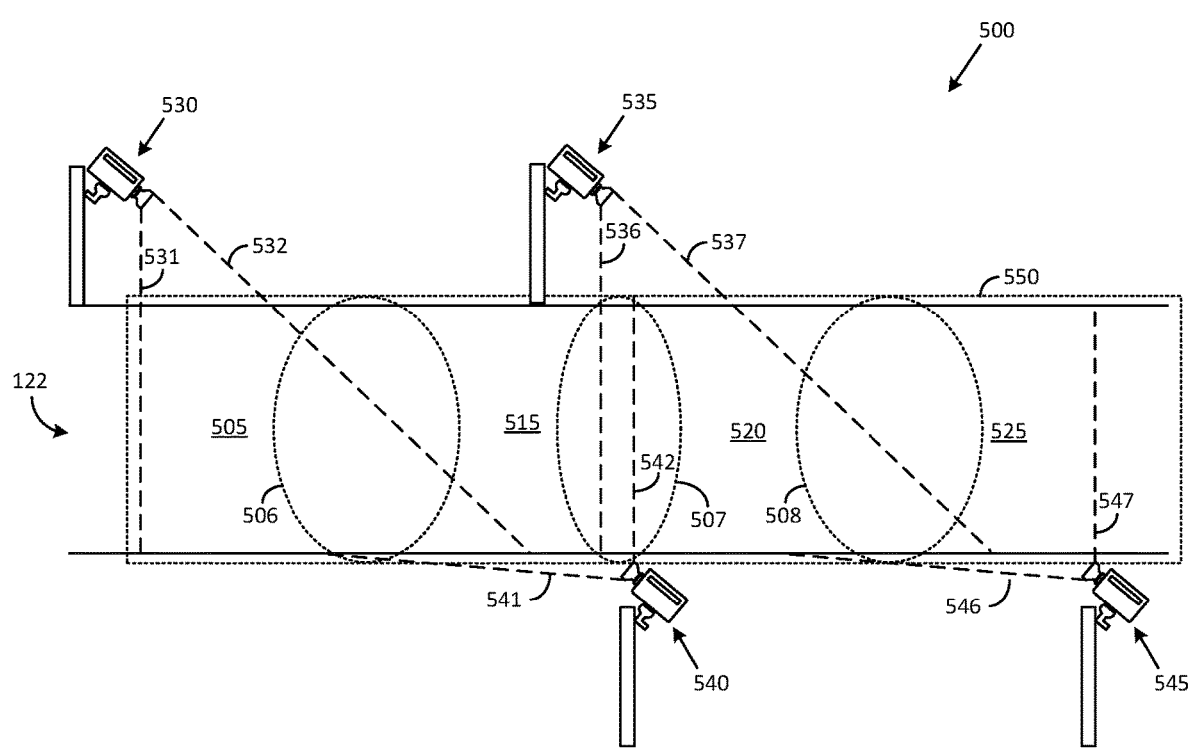
FIG. 5 illustrates a second exemplary monitoring system incorporating a digital twin displayed on a computer in accordance with another embodiment the disclosure.

FIG. 5 illustrates a second exemplary monitoring system 500 that can include two or more imaging apparatuses in accordance with an embodiment the disclosure. In the exemplary illustration shown in FIG. 5, a first imaging apparatus 530 provides an image capture area 505 that may be defined by a line-of-sight 532 and a line-of-sight 531 of the first imaging apparatus 530. Images captured by the first imaging apparatus 530 may be transmitted to the computer 105 via a network such as the network 110 shown in FIG. 1. The computer 105 may process these images for various purposes such as for displaying a digital twin 550 on the display screen 106 that includes objects present in the image capture area 505.

A second imaging apparatus 540 provides an image capture area 515 that may be defined by a line-of-sight 541 and a line-of-sight 542 of the second imaging apparatus 540. Images captured by the second imaging apparatus 540 may be transmitted to the computer 105 via a network such as the network 110. The computer 105 may process these images for various purposes such as for configuring the digital twin 550 to include objects present in the image capture area 515 in addition to the objects present in the image capture area 505.

In one exemplary implementation, the digital twin 550 may be provided in the form of a concatenated display that incorporates images captured by the second imaging apparatus 540 as well as images captured by the first imaging apparatus 530. In another implementation, the digital twin 550 can be provided in the form of two separate windows—a first window containing images captured by the first imaging apparatus 530 and a second window containing images captured by the second imaging apparatus 540.

In the example embodiment illustrated in FIG. 5, the image capture area 505 overlaps the image capture area 515 in an overlap area 506. The overlap area 506 allows for seamless tracking of a vehicle such as the vehicle 130 when the vehicle is moving on the road 122. The seamless tracking allows the computer 105 to eliminate blind spots by providing the computer 105, the ability to detect stoppage of the vehicle 130 at a boundary portion between the image capture area 505 and the image capture area 515.

A third imaging apparatus 535 provides an image capture area 520 that may be defined by a line-of-sight 536 and a line-of-sight 537 of the third imaging apparatus 535. An overlap area 507 allows for seamless tracking of a vehicle such as the vehicle 130, through the image capture area 515 and the image capture area 520. The seamless tracking allows the computer 105 to eliminate blind spots by providing the computer 105, the ability to detect stoppage of the vehicle 130 at a boundary portion between the image capture area 515 and the image capture area 520.

A fourth imaging apparatus 545 provides an image capture area 525 that may be defined by a line-of-sight 546 and a line-of-sight 547 of the fourth imaging apparatus 545. An overlap area 508 allows for seamless tracking of a vehicle such as the vehicle 130, through the image capture area 520 and the image capture area 525. The seamless tracking allows the computer 105 to eliminate blind spots by providing the computer 105, the ability to detect stoppage of the vehicle 130 at a boundary portion between the image capture area 520 and the image capture area 525.

In one exemplary implementation, the digital twin 550 may be provided in the form of a concatenated display that incorporates images captured by the first imaging apparatus 530, the second imaging apparatus 540, the third imaging apparatus 535, and the fourth imaging apparatus 545. In another implementation, the digital twin 550 can be provided in the form of four separate windows—a first window containing images captured by the first imaging apparatus 530, a second window containing images captured by the second imaging apparatus 540, a third window containing images captured by the third imaging apparatus 535, and a fourth window containing images captured by the fourth imaging apparatus 545.

In another exemplary implementation, some or all of the image capture areas can be modified in size for various reasons such as for defining one or more zones of primary interest and/or one or more zones of secondary interest in accordance with the disclosure.

Figure 6:
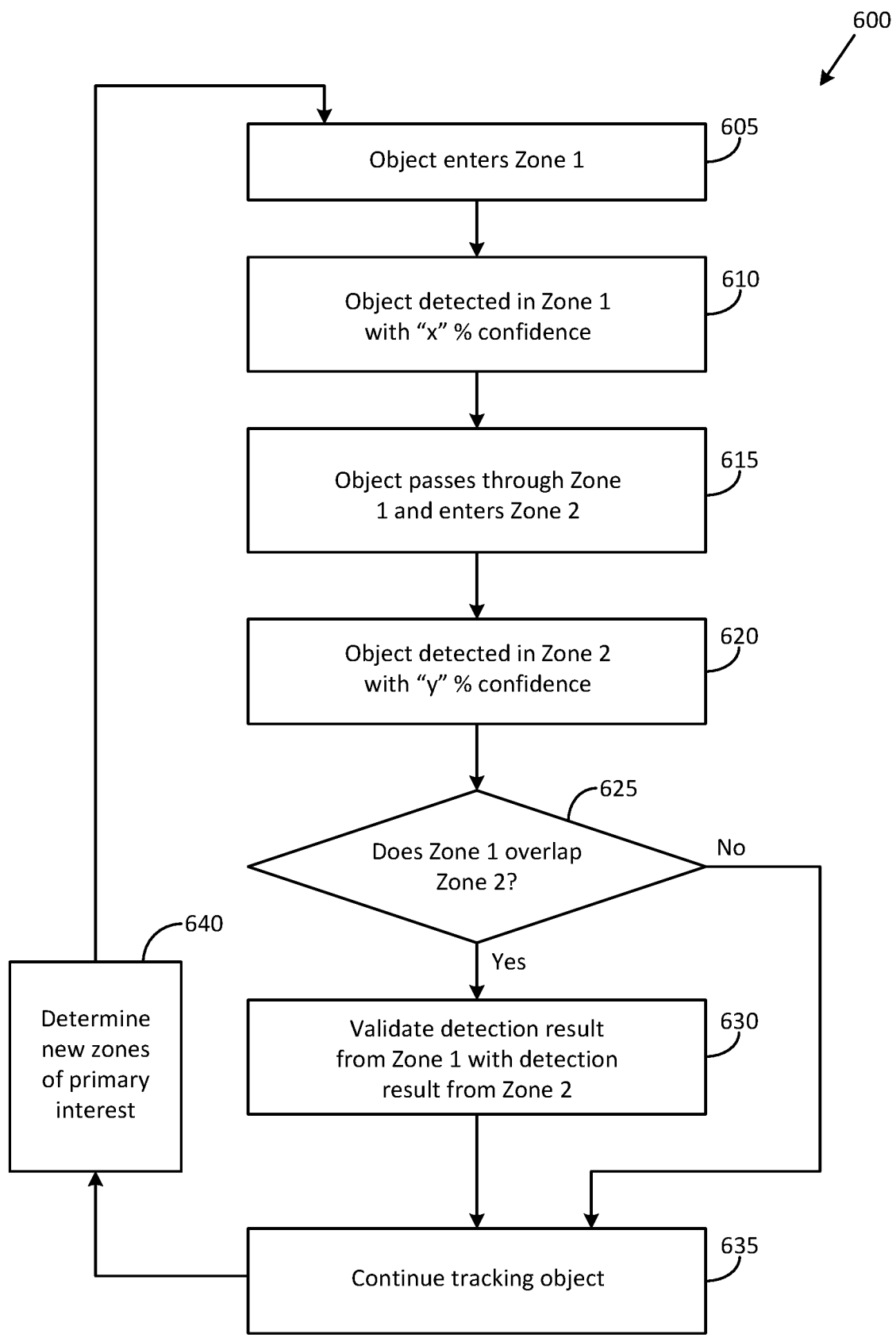
FIG. 6 shows a flowchart of a method of operating the second exemplary monitoring system shown in FIG. 5.

FIG. 6 shows an exemplary flowchart 600 of a method of operating the monitoring system 500 shown in FIG. 5. The exemplary flowchart 600 illustrates a sequence of operations that can be implemented in hardware, software, or a combination thereof. In the context of software, the operations represent computer-executable instructions stored on one or more non-transitory computer-readable media, that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the exemplary flowchart 600 may be carried out by using an application stored in a memory provided in the computer 105 and executed by a processor in the computer 105.

At block 605, an object such as the vehicle 130 shown in FIG. 1, enters a first zone (the image capture area 505, for example). At block 610, the first imaging apparatus 530 captures an image of the first zone and transmits the image to the computer 105. The computer 105 processes the image and detects the entry of the vehicle 130 into the first zone. The detection may be made with "x" % confidence level. For example, in one case, the image may have high resolution and the detection of the vehicle 130 (based on distinguishing marks on the vehicle 130, for example) may be carried out with a 99% confidence level. In another case, the image may have poor quality and the detection may be carried out with a 60% confidence level.

At block 615, the vehicle passes through the first zone and enters a second zone (the image capture area 515, for example). At block 620, the second imaging apparatus 540 captures an image of the second zone and transmits the image to the computer 105. The computer 105 processes the image and detects the entry of the vehicle 130 into the second zone. The detection may be made with "y" % confidence level. For example, in one case, the image may have high resolution and the detection of the vehicle 130 (based on distinguishing marks on the vehicle 130, for example) may be carried out with an 80% confidence level. In another case, the image may have poor quality and the detection may be carried out with a 40% confidence level.

At block 625, a determination is made whether the first zone overlaps the second zone. If an overlap exists (such as in the overlap area 506), at block 630, a detection result obtained from the first zone (having the "x" % confidence level) may be validated by using a detection result obtained from the second zone (having the "y" % confidence level).

At block 635, tracking of the vehicle 130 through additional zones may be carried out by using other imaging apparatuses such as the third imaging apparatus 535 and the fourth imaging apparatus 545. At block 640, one or more zones of primary interest may be determined or redefined and applied so as to recursively implement the operations described above.

If at block 625, the determination indicates no overlap (for example, in an implementation where the overlap area 506 does not exist), at block 635, tracking of the vehicle 130 through additional zones may be carried out as described above.

Figure 7:
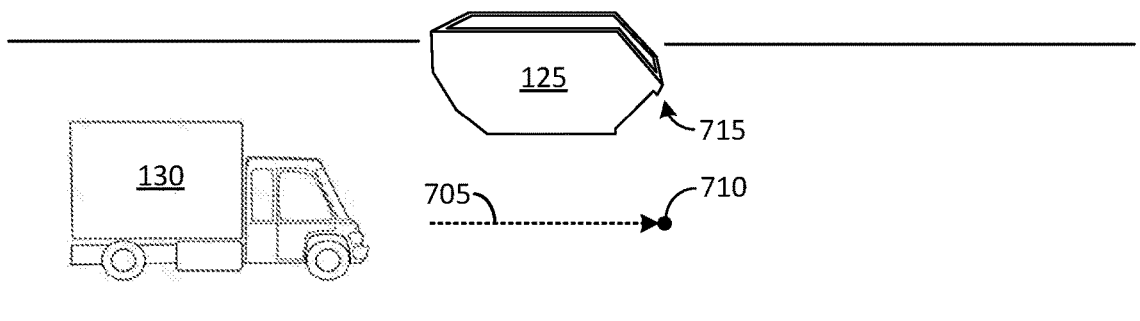
FIG. 7 shows a first exemplary traffic condition displayed in a digital twin in accordance with the disclosure.

FIG. 7 shows an exemplary traffic condition that may be displayed in the digital twin 107 at a first instant in time (t0) in accordance with the disclosure. The vehicle 130 is traveling eastwards along a path 705. At the first instant in time (t0), the vehicle 130 has not yet reached a spot 710. The spot 710, which is aligned with a distal end 715 of the dumpster 125 in this example.

Figure 8:
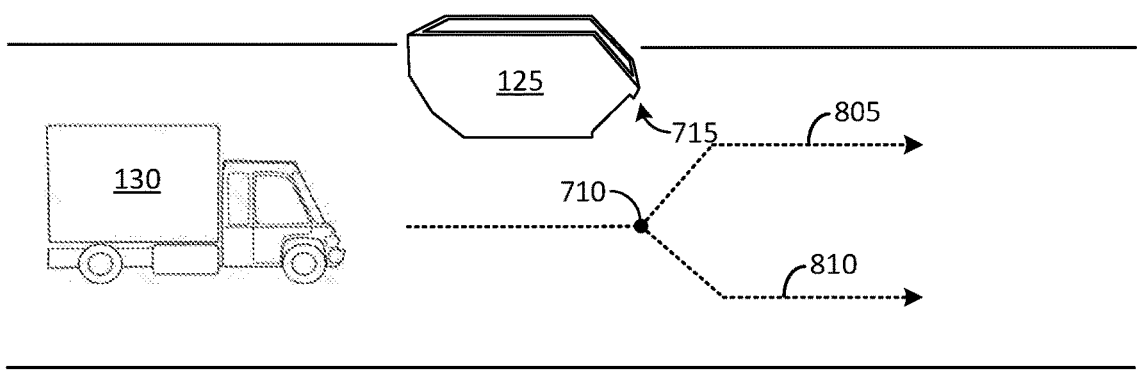
FIG. 8 illustrates predictive travel routes that may be taken by a vehicle shown in FIG. 7.

FIG. 8 illustrates a few exemplary predictive travel paths that the vehicle 130 may take after reaching the spot 710. The exemplary predictive travel paths may be identified by the computer 105 by executing a prediction procedure in accordance with the disclosure that may include processing one or more images provided to the computer 105 by the imaging apparatus 115 at the first instant in time (t0). In this example, the vehicle 130 may take one of a first predictive travel path 805 or a second predictive travel path 810. The prediction procedure used by the computer 105 can include various algorithms, models, and/or techniques such as Markov chains, neural networks, artificial intelligence (AI), and finite state machines.

The prediction procedure may be executed by the computer 105 independently, or in conjunction with other procedures such as image processing procedures or simulation procedures, for defining and/or redefining a perimeter of a zone of primary interest and/or a zone of secondary interest. In one exemplary case, the defining or redefining may be carried out by using a finite state machine (FSM) to simulate various conditions (states). The various states may change as a result of various types of inputs. For example, a state of the dumpster 125 may change if the dumpster 125 is moved after having been left undisturbed for a long period of time. As another example, a perimeter of a zone of primary interest, which may be used as one of the states in an FSM, may change based on an object entering the zone of primary interest.

Figure 9:
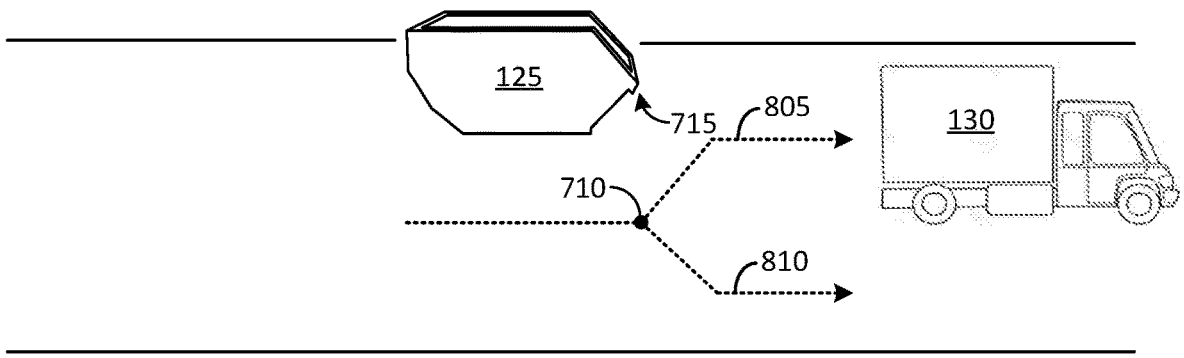
FIG. 9 shows the vehicle having taken one of the predictive travel routes shown in FIG. 8.

FIG. 9 shows the vehicle 130 having reached the spot 710 at a second instant in time (t1) and having opted to travel along the first predictive travel path 805. The action taken by the vehicle 130 to travel along the first predictive travel path 805 (rather than the second predictive travel path 810) may be identified by the computer 105 by executing a verification procedure in accordance with the disclosure. The verification procedure may include processing one or more images provided to the computer 105 by the imaging apparatus 115 at the second instant in time (t1).

The prediction procedure and the evaluation procedure described above may be used for various purposes such as for dynamically modifying one or more zones of primary interest and/or for dynamically modifying one or more zones of secondary interest, for pre-empting traffic congestion on the road 122, for issuing movement violation citations, and/or issuing parking citations.

Figure 10:
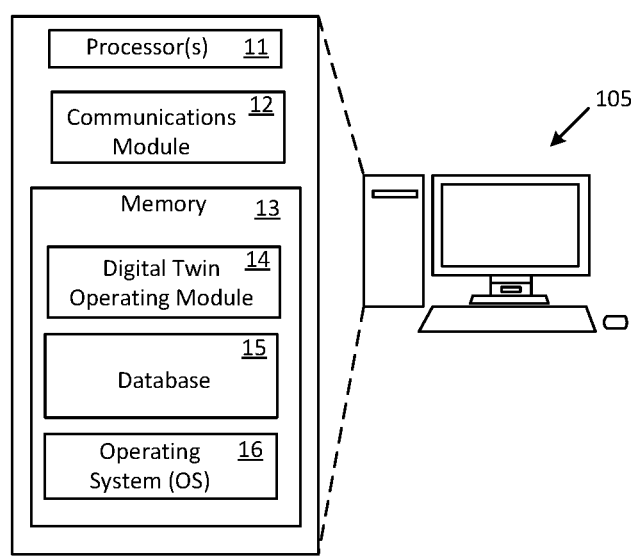
FIG. 10 shows some exemplary components of a computer that may be used to operate a digital twin in accordance with an exemplary embodiment of the disclosure.

FIG. 10 shows some exemplary components of the computer 105 in accordance with an embodiment of the disclosure. The computer 105 can include various components such as a processor 11, a communications module 12, and a memory 13. The memory 13, which is one example of a non-transitory computer-readable medium, may be used to store an operating system (OS) 16 and various other code modules such as a digital twin operating module 14 and a database 15.

The communications module 12, which may include an input/output interface for communicatively coupling the computer 105 to the network 110, allows the computer 105 to communicate with the server system 135 and with various imaging apparatuses such as the imaging apparatus 115 shown in FIG. 1. The digital twin operating module 14 may be executed by the processor 11 for implementing various operations described herein in accordance with the disclosure.

The memory 13 can include any one memory element or a combination of volatile memory elements (e.g., random-access memory (RAM, such as DRAM, SRAM, SDRAM, etc.)) and non-volatile memory elements (e.g., ROM, hard drive, tape, CD ROM, etc.). Moreover, the memory device may incorporate electronic, magnetic, optical, and/or other types of storage media. In the context of this document, a "non-transitory computer-readable medium" can be, for example, but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

In the context of software, the operations described herein with respect to the computer 105 may be implemented by computer-executable instructions stored on one or more non-transitory computer-readable media such as the memory 13, that, when executed by one or more processors such as the processor 11, perform the recited operations. Generally, computer-executable instructions include routines, programs, objects, components, data structures, and the like that perform particular functions or implement particular abstract data types.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein.

An implementation of the devices, systems, and methods disclosed herein may communicate over a computer network. A "network" and a "bus" is defined as one or more data links that enable the transport of electronic data between computer systems and/or modules and/or other electronic devices. When information is transferred or provided over a network, a bus, or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments. Although certain aspects of various embodiments may have been described using a singular word or phrase (such as "a signal" or "a processor") it should be understood that the description may be equally applicable to plural words or phrases (such as "signals" and "processors").

That which is claimed is:

1. A method of operating a digital twin, comprising:
    receiving, by a first computer, one or more images of a surveilled area;
    detecting, by the first computer and in the one or more images a movement of a first object through a first portion of the surveilled area during a first period of time;
    defining in the digital twin, by the first computer and based on the detection of the movement of the first object through the first portion of the surveilled area, the first portion of the surveilled area as a zone of primary interest;
    detecting, by the first computer and in the one or more images, a second object that is stationary in a second portion of the surveilled area during a second period of time;
    defining in the digital twin, by the first computer and based on the detection of the second object that is stationary in the second portion of the surveilled area, the second portion of the surveilled area as a zone of secondary interest, wherein the zone of primary interest and the zone of secondary interest comprise portions of the surveilled area for subsequent image capture;
    receiving images of the zone of primary interest at a first rate;
    receiving images of the zone of secondary interest at a second rate, wherein the second rate is lower than the first rate; and
    detecting, by the first computer and based on the digital twin, a pattern of movement of at least a first object through at least the zone of primary interest.

2. The method of claim 1, further comprising:
    receiving, by the first computer, one or more additional images of the surveilled area;
    detecting, by the first computer and based on the one or more additional images, a modification in the pattern of movement of the first object in at least one of the zone of primary interest or the zone of secondary interest; and
    redefining, by the first computer and based at least in part on detecting the modification in the pattern of movement of the first object, the zone of primary interest.

3. The method of claim 2, wherein detecting the modification in the pattern of movement of the first object comprises at least one of:
    the first object moving out of the zone of primary interest,
    the first object moving out of the zone of secondary interest, or
    the first object moving from the zone of primary interest and into the zone of secondary interest.

4. The method of claim 1, wherein defining, by the first computer, the first portion of the surveilled area as the zone of primary interest further comprises, or
    identifying, by the first computer and based on information provided to the first computer by at least a second computer, one or more traffic rules applicable to the first portion of the surveilled area.

5. The method of claim 4, wherein defining, by the first computer, the second portion of the surveilled area as the zone of secondary interest further comprises
    identifying, by the first computer and based on the information provided to the first computer by the second computer, one or more parking rules applicable to the second portion of the surveilled area.

6. The method of claim 5, wherein the one or more images are provided to the first computer by an imaging apparatus, and wherein the second period of time is greater than the first period of time.

7. The method of claim 1, wherein the first object is one of a vehicle or a pedestrian and wherein at least one of the zone of primary interest or the zone of secondary interest is further defined by the first computer based on one or more traffic rules applicable to the surveilled area.

8. A method of operating a digital twin, comprising:
    receiving, by a first computer, from a first imaging apparatus, one or more images of a first surveilled area;
    detecting, by the first computer and in the one or more images a movement of a first object through the first surveilled area;
    defining, by the first computer, in the digital twin, and based on the detection of the movement of the first object through the first surveilled area, a first zone of primary interest in the first surveilled area;
    receiving, by the first computer, from a second imaging apparatus, one or more images of a second surveilled area;
    detecting, by the first computer and in the one or more images a movement of a second object through the second surveilled area;
    defining, by the first computer, in the digital twin, based and based on the detection of the movement of the second object through the second surveilled area, a second zone of primary interest in the second surveilled area, wherein the first zone of primary interest and second zone of primary interest comprise portions of the surveilled area for subsequent image capture;
    receiving images of the first zone of primary interest or the second zone of primary interest at a first rate;
    utilizing, by the first computer, the digital twin to detect a pattern of movement of at least a first object through at least one of the first zone of primary interest or the second zone of primary interest; and
    redefining, by the first computer, at least one of the first zone of primary interest or the second zone of primary interest based at least in part on the pattern of movement of the first object.

9. The method of claim 8, wherein the first object is one of a vehicle or a pedestrian and wherein at least one of the first zone of primary interest or the second zone of primary interest is further defined by the first computer based on one or more traffic rules applicable to at least one of the first surveilled area or the second surveilled area.

10. The method of claim 9, further comprising:
defining, by the first computer, in the digital twin, based at least in part on the one or more images of the first surveilled area, a first zone of secondary interest in the first surveilled area; and
defining, by the first computer, in the digital twin, based at least in part on the one or more images of the second surveilled area, a second zone of secondary interest in the second surveilled area; and
utilizing, by the first computer, the digital twin to monitor at least a second object that is located in one of the first zone of secondary interest or the second zone of secondary interest.

11. The method of claim 10, wherein the second object is one of a parked vehicle or an object that has been stationary for a predefined period of time.

12. The method of claim 11, wherein the predefined period of time is one of a number of minutes, a number of hours, or a number of calendar units.

13. The method of claim 10, wherein the first object is a vehicle, and further comprising:
utilizing, by the first computer, the digital twin to at least one of predict or track the pattern of movement of the vehicle through at least one of the first zone of primary interest or the second zone of primary interest.

14. The method of claim 10, wherein the first object is a vehicle, and further comprising:
utilizing, by the first computer, the digital twin to further detect a stoppage of the vehicle in the at least one of the first zone of secondary interest or the second zone of secondary interest.

15. The method of claim 14, wherein redefining, by the first computer, at least one of the first zone of primary interest or the second zone of primary interest, is further based on the stoppage of the vehicle in the at least one of the first zone of secondary interest or the second zone of secondary interest.

16. A computer comprising:
at least one memory that stores computer-executable instructions; and
at least one processor configured to access the at least one memory and execute the computer-executable instructions to at least:
operate a digital twin of a surveilled area;
receive in the digital twin, one or more images of the surveilled area;
detect, in the one or more images, a movement of a first object through a first portion of the surveilled area during a first period of time;
define, in the digital twin and based on the detection of the movement of the first object through the first portion of the surveilled area, the first portion of the surveilled area as a zone of primary interest;
detect in the one or more images, a second object that is stationary in a second portion of the surveilled area during a second period of time;
define, in the digital twin, and based on the detection of the second object that is stationary in the second portion of the surveilled area, the second portion of the surveilled area as a zone of secondary interest, wherein the zone of primary interest and the zone of secondary interest comprise portions of the surveilled area for subsequent image capture;
receive images of the zone of primary interest at a first rate;
receive images of the zone of secondary interest at a second rate, wherein the second rate is lower than the first rate; and
utilize the digital twin to detect a pattern of movement of at least a first object through at least the zone of primary interest.

17. The computer of claim 16, wherein the at least one processor is further configured to execute the computer-executable instructions to:
receive one or more additional images of the surveilled area;
detect, based on the one or more additional images, a modification in the pattern of movement of the first object in at least one of the zone of primary interest or the zone of secondary interest, wherein the zone of primary interest and the zone of secondary interest comprise portions of the surveilled area for subsequent image capture; and
redefine the zone of primary interest, based at least in part on detecting the modification in the pattern of movement of the first object.

18. The computer of claim 17, wherein the modification in the pattern of movement of the first object is detected based on at least one of:
the first object moving out of the zone of primary interest,
the first object moving out of the zone of secondary interest, or
the first object moving from the zone of primary interest and into the zone of secondary interest.

19. The computer of claim 16, wherein the first portion of the surveilled area is defined as the zone of primary interest based on at least one of:
detecting, in the one or more images, a movement of the first object through the first portion of the surveilled area during a first period of time, or
identifying, one or more traffic rules applicable to the first portion of the surveilled area.

20. The computer of claim 17, wherein the second portion of the surveilled area is defined as the zone of secondary interest based on at least one of:
detecting, in the one or more images, a second object that is stationary in the second portion of the surveilled area during a second period of time, or
identifying, one or more parking rules applicable to the second portion of the surveilled area.

* * * * *